United States Patent
Bock et al.

(10) Patent No.: US 6,645,416 B2
(45) Date of Patent: Nov. 11, 2003

(54) INSULATION OF STATOR WINDINGS BY INJECTION MOLDING

(75) Inventors: Albrecht Bock, Hohentengen (DE); Thomas Baumann, Wettingen (CH); Joerg Oesterheld, Birmenstorf (CH)

(73) Assignee: Alstom Ltd., Baden (CH)

( * ) Notice: Subject to any disclaimer, the term of this patent is extended or adjusted under 35 U.S.C. 154(b) by 0 days.

(21) Appl. No.: 09/852,787

(22) Filed: May 11, 2001

(65) Prior Publication Data

US 2001/0047878 A1 Dec. 6, 2001

(30) Foreign Application Priority Data

May 12, 2000 (DE) .......................................... 100 23 208

(51) Int. Cl.⁷ ............................................... B29C 45/14
(52) U.S. Cl. ...................... 264/275; 264/277; 264/278; 264/295
(58) Field of Search .............................. 264/271.1, 263, 264/272.11, 275, 277, 278, 272.19, 272.2, 295, 130; 425/116, 123, 125; 29/596, 602.1, 605

(56) References Cited

U.S. PATENT DOCUMENTS

| | | | | |
|---|---|---|---|---|
| 3,668,779 A | * | 6/1972 | Turner | 264/263 |
| 4,133,101 A | * | 1/1979 | Glover | 264/156 |
| 4,470,786 A | * | 9/1984 | Sano et al. | 264/272.14 |
| 5,115,556 A | | 5/1992 | Gavrilidis et al. | |
| 5,500,177 A | * | 3/1996 | Uemichi et al. | 264/272.21 |
| 5,527,502 A | * | 6/1996 | Kiuchi et al. | 264/250 |
| 5,639,403 A | * | 6/1997 | Ida et al. | 264/255 |
| 5,650,031 A | | 7/1997 | Bolon et al. | |
| 5,766,985 A | * | 6/1998 | Mangiagli et al. | 264/272.17 |
| 6,063,321 A | * | 5/2000 | Koyama et al. | 264/272.15 |
| 6,309,579 B1 | * | 10/2001 | Koyama et al. | 264/278 |
| 6,375,884 B1 | * | 4/2002 | Shikama et al. | 264/254 |

FOREIGN PATENT DOCUMENTS

| | | |
|---|---|---|
| DE | 264653 | 9/1968 |
| DE | 26 59 065 | 7/1978 |
| DE | 43 30 323 | 3/1995 |
| DE | 43 44 044 A1 | 6/1995 |
| DE | 400 124 | 10/1995 |
| DE | 196 09 253 | 7/1999 |
| DE | 198 60 412 A1 | 6/2000 |
| EP | 0 923 188 A2 | 6/1999 |
| JP | 61-286112 | 5/1987 |
| WO | 94/19176 | 9/1994 |

OTHER PUBLICATIONS

Patent Abstracts of Japan, vol. 009, No. 321, Publication No. 60154514, published Aug. 14, 1985.

* cited by examiner

*Primary Examiner*—Angela Ortiz
(74) *Attorney, Agent, or Firm*—Burns, Doane, Swecker & Mathis, L.L.P.

(57) ABSTRACT

The invention relates to a method for applying the main insulation of conductor bars, in particular conductor bars for stator windings, whereby the conductor bars have a rectangular cross-section. The method comprises the following steps: insertion of a conductor bar with ends in an injection mold; centering of the conductor bar in the injection mold so that a void for holding an insulation material remains between the conductor bar and the injection mold; filling of the void with an elastomer in order to form the main insulation.

21 Claims, 4 Drawing Sheets

INSULATION OF STATOR WINDINGS BY INJECTION MOLDING

BACKGROUND OF THE INVENTION

The invention relates to a method for insulating stator windings for rotating electrical machines, in particular, direct current machines and alternating current machines.

In general, such electrical machines are provided with a stator and a rotor in order to convert mechanical energy into electrical energy (i.e., a generator) or, vice versa, to convert electrical energy into mechanical energy (i.e., an electric motor). Depending on the operating status of the electrical machine, voltages are generated in the conductors of the stator windings. This means that the conductors of the stator windings must be appropriately insulated in order to avoid a short circuit.

Stator windings in electrical machines can be constructed in different ways. It is possible to bundle several individual conductors that are insulated against one another and to provide the conductor bundle created in this manner, often called a conductor bar, with a so-called main insulation. To produce the stator windings, several conductor bars are connected with each other at their frontal faces. This connection can be made, for example, with a metal plate to which both the respective insulated individual conductors of the first conductor bar as well as the respective insulated individual conductors of the second conductor bar are connected in a conductive manner. The individual conductors of the conductor bar are therefore not insulated from each other in the area of the metal plate.

Alternatively to bundling the individual conductors into conductor bars, a long, insulated individual conductor is wound to a flat, oval coil that is called an original coil form, or "fish." In a subsequent process, the so-called spreading, the original coil forms are transformed into their final shape and built into the stator.

With both of the above-described manufacturing techniques, both round and rectangular individual conductors can be used. The conductor bars or original coil forms produced from several individual conductors for the stator windings again may have round or rectangular cross-sections. The invention at hand preferably looks at conductor bars or original coil forms with a rectangular cross-section that were made from rectangular individual conductors. The conductor bars may be manufactured either as Roebel transpositions, i.e., with individual conductors twisted around each other, or not as Roebel transpositions, i.e., with untwisted individual conductors that extend parallel to each other.

According to the state of the art, mica paper that has been reinforced with a glass fabric carrier for mechanical reasons, is usually wrapped tape-like around the conductor in order to insulate the stator windings (e.g., conductor bars, original coil forms, coils). The wound conductor, which may also be shaped after being taped, is then impregnated with a hardening resin, resulting in a duroplastic, non-meltable insulation. Also known are mica-containing insulations with a thermoplastic matrix that are also applied to the conductor in the form of a tape, such as, for example, asphalt, shellac (Brown Boveri Review Vol. 57, p. 15: R. Schuler: "Insulation Systems for High-Voltage Rotating Machines"), polysulfone and polyether ether ketone (DE 43 44044 A1). These insulations can be plastically reshaped when the melting temperature of the matrix is exceeded.

The insulations of stator windings that have been applied by wrapping have the disadvantage that their manufacture is time-and cost-intensive. In this context, special mention should be made of the wrapping process and impregnation process since they cannot be significantly accelerated any further because of the physical properties of the mica paper and impregnation resin. This manufacturing process is particularly prone to defects especially in the case of thick insulations, if the mica paper adapts insufficiently to the stator winding. In particular, an insufficient adjustment of the wrapping machine after wrapping the stator winding may result in wrinkles and tears in the mica paper, for example, because of a too steep or flat angle between the mica paper and the conductor, or because of an unsuitable static or dynamic tensile force acting on the mica paper during the wrapping. An excessive tape application may also result in overlaps that prevent uniform impregnation of the insulation in the impregnation tool. This may create a locally or generally defective insulation with reduced short-term or long-term stability. This significantly reduces the life span of such insulations for stator windings.

In addition, manufacturing processes for encasing conductor bundles are known from cable technology, whereby conductor bundles with a round cross-section are always encased with a thermoplast or with elastomers in an extrusion process. Document U.S. Pat. No. 5,650,031, which is related to the same subject matter as WO 97/11831, describes such a process for insulating stator windings in which the stator winding is passed through a central bore of an extruder. The stator winding, which has a complex shape, is hereby encased simultaneously with an extruded thermoplastic material at each side of the complex form, especially by coextrusion.

Also known from cable technology are polymeric insulations applied to the cables using a hot shrink-on technique. This relates to prefabricated sleeves with a round cross-section of curing thermoplasts, elastomers, polyvinylidene fluoride, PVC, silicone elastomer, or Teflon. After fabrication, these materials are stretched in their warm state and cooled. Once cooled, the material retains its stretched shape. This is accomplished, for example, because crystalline centers that fix the stretched macromolecules are formed. After repeated heating beyond the crystalline melting point, the crystalline zones are dissolved, whereby the macromolecules return to their unstretched state, and the insulation is in this way shrunk on. Also known are cold shrink-on sleeves that are mechanically stretched in their cold state. In the stretched state, these sleeves are pulled over a support structure that holds the sleeves permanently in the stretched state. Once the sleeves have been pushed and fixed over the components to be insulated, the support structure is removed in a suitable manner, for example, by pulling a spiral, perforated support structure out. But such shrink-on techniques cannot be used for stator windings with a rectangular cross-section since the sleeves with their round cross-section easily tear along the edges of the rectangular conductors, either immediately after shrinking or after strained briefly while the electrical machine is operated, because of the thermal and mechanical stresses.

Even while the stator windings are being manufactured, especially during the bending and handling of the conductors, particularly during installation into the stator, the insulation must be able to bear a significant high mechanical stress which could damage the insulation of the stator windings. The insulation of the stator winding conductors is also exposed to a combined stress during operation of the electrical machine. On the one hand, the insulation is dielectrically stressed between the conductor, to which is a high voltage is applied, and the stator, by a resulting electrical field. On the other hand, the heat generated in the conductor exposes the insulation to a thermal alternating stress, whereby a high temperature gradient is present in the insulation while the machine passes through the respective operating states. Because the materials involved expand differently, mechanical alternating stresses also occur. This results both in a shearing stress of the bond between conductor and insulation and a risk of abrasion at the interface between insulation and slot wall of the stator. Because of these high stresses, the insulation of the stator windings may tear, resulting in a short circuit. Consequently, the entire electrical machine will fail, and the repair will be time- and cost-intensive.

SUMMARY OF THE INVENTION

The invention involves a process for insulating stator windings for rotating electrical machines, whereby insulated stator windings are produced that ensure the insulation of the stator winding over the intended life span of the electrical machine.

The invention utilizes the fact that the elastomer is highly elastic, yet is able to withstand high thermal and electrical stresses. In the case of higher thermal stresses, silicone elastomer can be used advantageously.

Elastomers as a material for the main insulation promote the application of an injection molding process. The individual parts of the injection mold are preferably constructed in a modular manner for covering the conductor bar geometries that occur more frequently.

It is preferred that the conductor bars are centered with spacer elements or adjustable mandrels in the casting mold. The centering must be accomplished in such a way that the void between conductor bar and casting form has the same height at any point. The scope of this invention also includes providing main insulations with different thicknesses around the conductor bar. A uniform thickness of the main insulation is, however, a preferred embodiment.

In another method according to the invention, an internal corona shielding is applied between the insulating layer and the conductor surface. This is accomplished, for example, with a suitable injection molding process, in which several individual layers can be placed on top of each other.

In a particularly preferred method, the conductor bars are only brought into their final shape after being encased with the elastomer. The bending of the involutes greatly stretches the applied insulation. The use of elastomer according to the invention is hereby found to be particularly advantageous, since it reduces or even completely avoids the mechanical, electrical or thermal injury to the insulation that is being stressed by bending.

BRIEF DESCRIPTION OF THE DRAWINGS

The invention is described in more detail below with reference to the drawings, using exemplary embodiments.

The figures only show the elements and components essential for understanding the invention. The shown methods and devices according to the invention therefore can be supplemented in many ways or can be modified in a manner obvious to one skilled in the art, without abandoning or changing the concept of the invention.

DESCRIPTION OF THE PREFERRED EMBODIMENTS

Figure 1A:
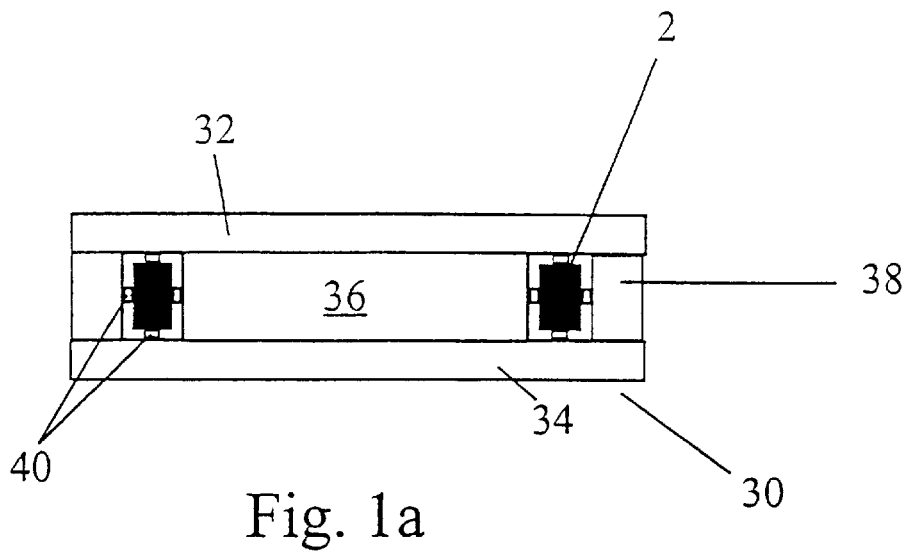
FIG. 1a shows a cross-section through an injection mold in which two conductor bars are centered by spacer elements in the casting mold.

FIG. 1a shows the cross-section through an injection mold 30 in which two conductor bars 2 are centered by spacer elements 40 in the mold chambers. The injection mold 30 consists of a cover 32 and a bottom plate 34. Between two mold chambers, a center part 36 is provided, which forms a side wall of each of one of the adjoining mold chambers. The other two side walls of the two mold chambers are formed by edge parts 38.

The conductor bars themselves are usually constructed from a bundle of individual, insulated conductors. In the case of Roebel-transposed conductor bars, the individual conductors are in part twisted around each other, while in non-Roebel-transposed conductor bars the individual bars extend parallel to each other without twisting. In the invention, conductor bars with individual conductors having a round cross-section can be used. It is especially advantageous, however, if the method according to the invention is used for conductor bars with individual conductors having a rectangular cross-section. When using rectangular cross-sections, the advantages of the invention are also realized when the cross-sections of the individual conductors and/or of the conductor bar slightly deviate from the rectangular shape. If the conductor bar is constructed of individual conductors, it is advantageous that the latter are connected with each other temporarily in order to enable a uniform and cavity-free encasing of the conductor bar with the main insulation, for example, by temporarily bonding the individual conductors with an elastic material or an adhesive with low mechanical strength against shearing forces, so that later bending is not impeded. Alternatively, an adhesive that loses its bending power during moderate heating (e.g., before bending) and thus promotes the bending process.

The injection mold of FIG. 1a shows two mold chambers. The number of mold chambers per injection mold can be varied at any time, however. A reduction to one casting mold is achieved, for example, by removing the center part 36 and moving at least one of the two edge parts 38 in the direction of the other edge part. On the other hand, the number of mold chambers can be increased by using, for example, several center parts 36 with reduced width. In this way, the center part 36 shown in FIG. 1a can be replaced with two narrower center parts, between which another casting mold is formed.

The geometrical dimensions of the individual parts of the injection mold 30, i.e., in particular cover 32, bottom plate 34, center part(s) 36, and edge parts 38, can be varied in such a manner that they form elements of a modular system and in this way cover a variety of possible bar geometries (cross-section, length). The use of center parts 36 and edge parts 38 with different heights while retaining the same geometrical extensions of the injection mold, makes it possible to coat conductor bars with different cross-sections, for example, conductor bars 2 having the same width but different heights. Alternatively, a conductor bar of corresponding height which is twisted by 90° around its longitudinal axis can be placed into the casting mold in order to coat conductor bars 2 of identical height but different widths. Smaller variations in the conductor cross-section can also be compensated by greater layer thicknesses of the main insulation to be cast. A variety of different cross-sections of conductor bars can be coated by combining center parts 36 and edge parts 38 of different heights with center parts 36 and edge parts 38 of different widths. The flexibility of the modular system for the injection molds can also be increased by using spacer plates. These plates can be provided advantageously at the side, bottom, or ceiling plates of the mold chambers in order to reduce the width or height of the mold chamber.

In a preferred embodiment, the insulation thicknesses are identical on the narrow and wide sides of the conductor bar. In a particularly advantageous embodiment, the insulation thickness is greater on the narrow sides of the conductors than on the wide sides, so that the electrical field elevation is reduced at the conductor edges without hindering the dissipation of heat over the wide side.

Figure 1B:
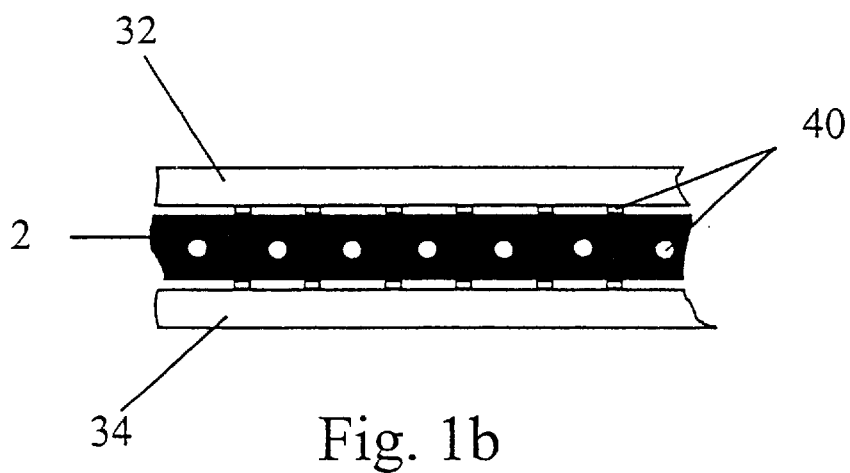
FIG. 1b shows a longitudinal section through an injection mold in which one conductor bar is centered by spacer elements in the casting mold.
Figure 1C:
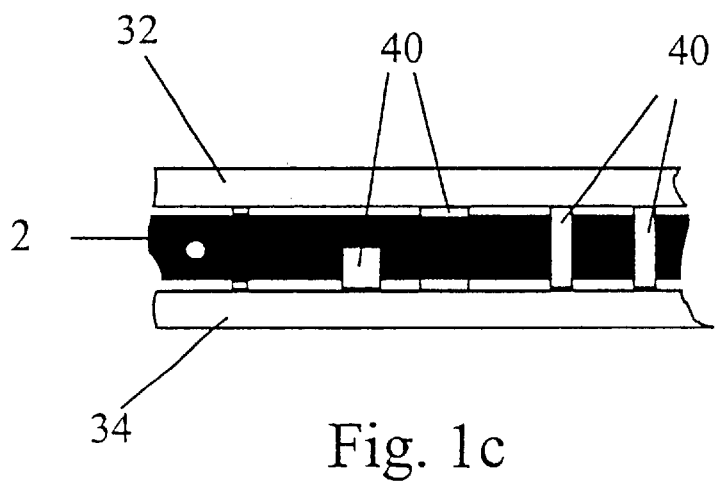
FIG. 1c shows a longitudinal section through an injection mold in which one conductor bar is centered by spacer elements with different shapes in the casting mold.

FIG. 1b shows a longitudinal section through one of the mold chambers shown in FIG. 1a. The cylindrical spacer elements 40 hereby center the conductor bar 2 in such a way in the mold chamber that the layer thickness of the main insulation has the same height on all sides. By using spacer elements with different heights, a main insulation with a varying layer thickness can be applied around the conductor bar, if needed. It is hereby not necessary that cylindrical spacer elements 40 are used. Spacer elements with a square or rectangular cross-section fulfill the same purpose, but facilitate the spacing of the conductor bars from the side walls since they can be placed with one of their narrow sides onto the bottom of the casting mold without rolling off. FIG. 1c shows spacer elements 40 with a rectangular cross-section. Alternatively to this, spacer elements that completely enclose the conductor bar can be used. It is preferred that completely enclosing spacer elements 40 are cut open on one of their sides so that they can be placed more easily around the conductor bar.

An elastomer is used as a material for the main insulation. The elastomer is characterized by high elasticity. It also has a high electrical and thermal stability. In particular for thermally highly stressed machines it is preferred that silicone elastomers are used. Especially the advantageous use of elastomer (in contrast to other materials), permits the use of injection molding processes and fulfills the high requirements for material resistance and mechanical flexibility. The elastomers may be cold- or hot-curing types. The curing for cold-curing types is initiated, for example, by mixing two components, whereby one of the components contains a curing agent. In the case of hot-curing types, the elastomer can be heated already in the injection mold and/or after the encasing of the conductor bar. The latter is done preferably with hot air (oven) or by a resistive or inductive heating of the conductor bar.

The material properties of the main insulation can be adjusted in such a way by adding chemically active (e.g., silicic acid) and passive (e.g., quartz sand) fillers, so that they fulfill the respective mechanical requirements of the electrical machines into which the stator windings provided with the main insulation are installed.

The centering of the conductor bars in the mold chamber (given a main insulation with identical layer thickness) or the spacing of the conductor bar from the individual walls of the mold chamber is accomplished, as already mentioned, by using spacer bars 40 with different shapes and heights that are placed at a suitable distance from each other onto the bar or into the mold chamber. It is preferred that the spacer elements are made from the same material as the main insulation. The spacer elements are provided with a certain dimensional stability by partially curing the material. On the other hand, they still have sufficient reactive bonds, however, to be able to form a tight chemical bond with the cast material of the main insulation. Depending on the material used, simple trials can be conducted to establish the degree of curing that must be present in the material of the spacer elements so that the same or equivalent mechanical and electrical strengths can be obtained at the interfaces as in the homogenous material of the main insulation that does not have any interfaces.

Figure 2A:
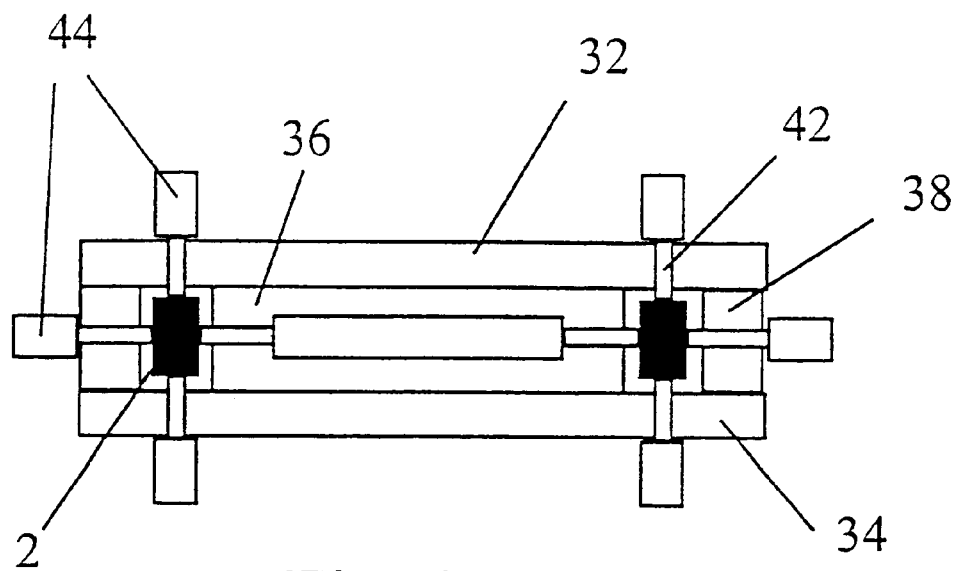
FIG. 2a shows a cross-section through an injection mold in which two conductor bars are centered by adjustable mandrels in the casting mold.
Figure 3:
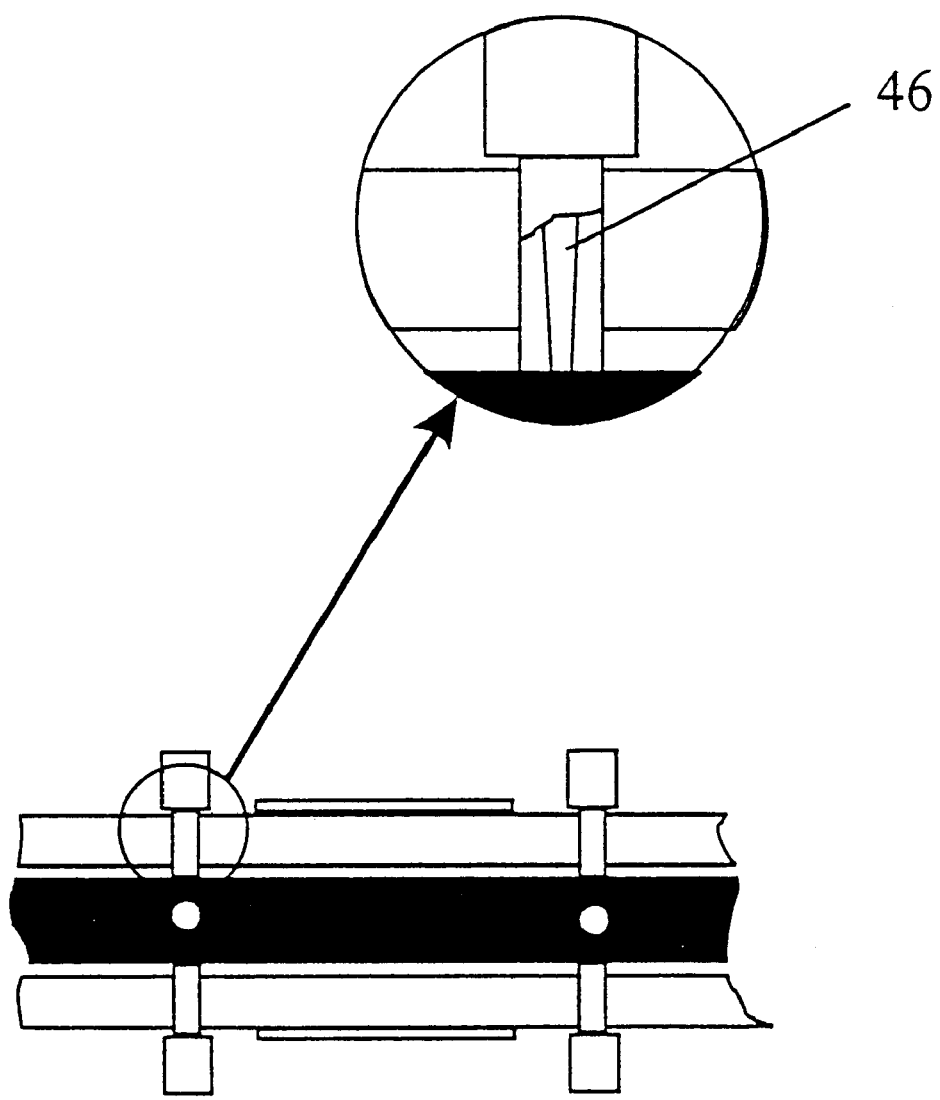
FIG. 3 shows a detail of the adjustable mandrel in FIG. 2b.

In FIGS. 2a and b, adjustable mandrels 42 are used to center the conductor bars 2 within the mold chamber of the injection mold or space them from the walls of the mold chamber. A control element 44 permits a precise adjustment of the individual mandrels 42, which also can be moved in a defined manner when the injection mold is closed. During the injection process of the elastomer and the initial curing, the conductor bar is held by the mandrels in the desired position. As curing progresses, the elastomer injected as material for the main insulation reaches a firmness that holds the conductor bar in its desired position even without the mandrels. After the main insulation has reached this firmness, the mandrels 42 are withdrawn, and the resulting voids are filled with liquid elastomer. The liquid material is injected into the voids through the injection channels 46 (see FIG. 3) inside the mandrels 42. The material injected in the area of the mandrels can be in liquid or gel form, but must still have sufficient reactive bonds so that the mechanical and electrical properties of the main insulation at the interface correspond to those of the homogenous material of the main insulation. The adjoining material around the mandrel may already be firm yet must still be reactive. To promote the curing at the interface, a heating region 50 may be provided, for example, between two spacer mandrels. In this way, the heat and thus the curing front spreads starting from the heating region in the direction of the mandrels so that the start of curing is delayed, and the material near the mandrels therefore is still able to sufficiently react with the elastomer freshly supplied through the injection channel 46. As an alternative or additionally to this, the mandrels 42 can be cooled. This cooling makes it possible to delay the curing of the material in and around the mandrel.

Figure 2B:
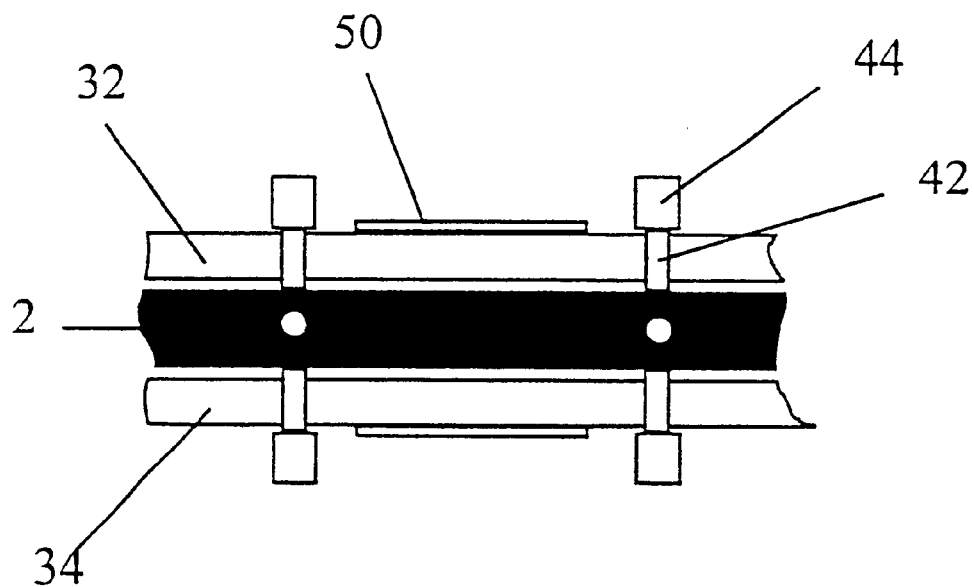
FIG. 2b shows a longitudinal section through an injection mold in which one conductor bar is centered by adjustable mandrels in the casting mold.

The injection molds shown in FIGS. 1 and 2 preferably are designed open at their longitudinal ends. They are closed off with sealing caps that enclose the conductor in a pressure-proof manner during the injection molding. This permits the processing of bars with different lengths. In order to insulate the conductor bar along its entire length, the main insulation may be applied in one or more steps, or several injection molds of the modular system are put together to form a partial or complete injection mold. The seams created in this way can be constructed according to the above described curing process. This also ensures that the required material properties are present at the seams.

In some applications, it is preferred that the conductor bars are provided with slot corona shielding and termination (yoke corona shielding) as well, if applicable, with an internal corona shielding. The internal corona shielding of a stator winding is usually a conductive material layer located between main insulation and conductor bar. It provides for a defined potential coating around the conductor bar and prevents electrical discharges that can be caused by voids between the conductor bar and the main insulation. The slot or external corona shielding of a stator winding is usually a conductive material layer located between the main insulation and the stator slot. The external corona shielding, which again creates a defined potential coating, is supposed to prevent electrical discharges that can be caused, for example, by varying distances of the high potential insulated conductor bar from the grounded stator nut. The termination (yoke corona shielding) usually prevents electrical discharges at the slot exit of a conductor bar. Options for applying such protective layers within the scope of this invention include, for example, conductive or semi-conductive elastomer-based finishes, suitable tapes (possibly self-fusing), which can be cured by irradiation or heat. Alternatively, cold- or heat-shrink-on sleeves (for example, for bars) or cuffs (for example, for coils) can be used. When using shrink-on sleeves or cuffs for the internal corona shielding, these may be provided advantageously on their inside with a flowable, plastic material to fill the voids on the surface of the conductor bar. This is basically also possible for an external corona shielding.

In another preferred embodiment of the method, internal corona shielding, main insulation, and/or external corona shielding are applied with the help of several consecutive injection molding processes. This may be accomplished in different injection molds with different cross-sections or in the same mold, whereby the mold chamber is then provided during the corresponding injection molding steps with filler profiles (spacer plates) in order to leave room for the next layer. It is also possible to provide the mold chamber with movable sections. Movable sections are part of a casting mold that can be arranged so that an additional layer is injected, for example, only in the area of the termination (slot corona shielding end to termination end).

Figure 4:
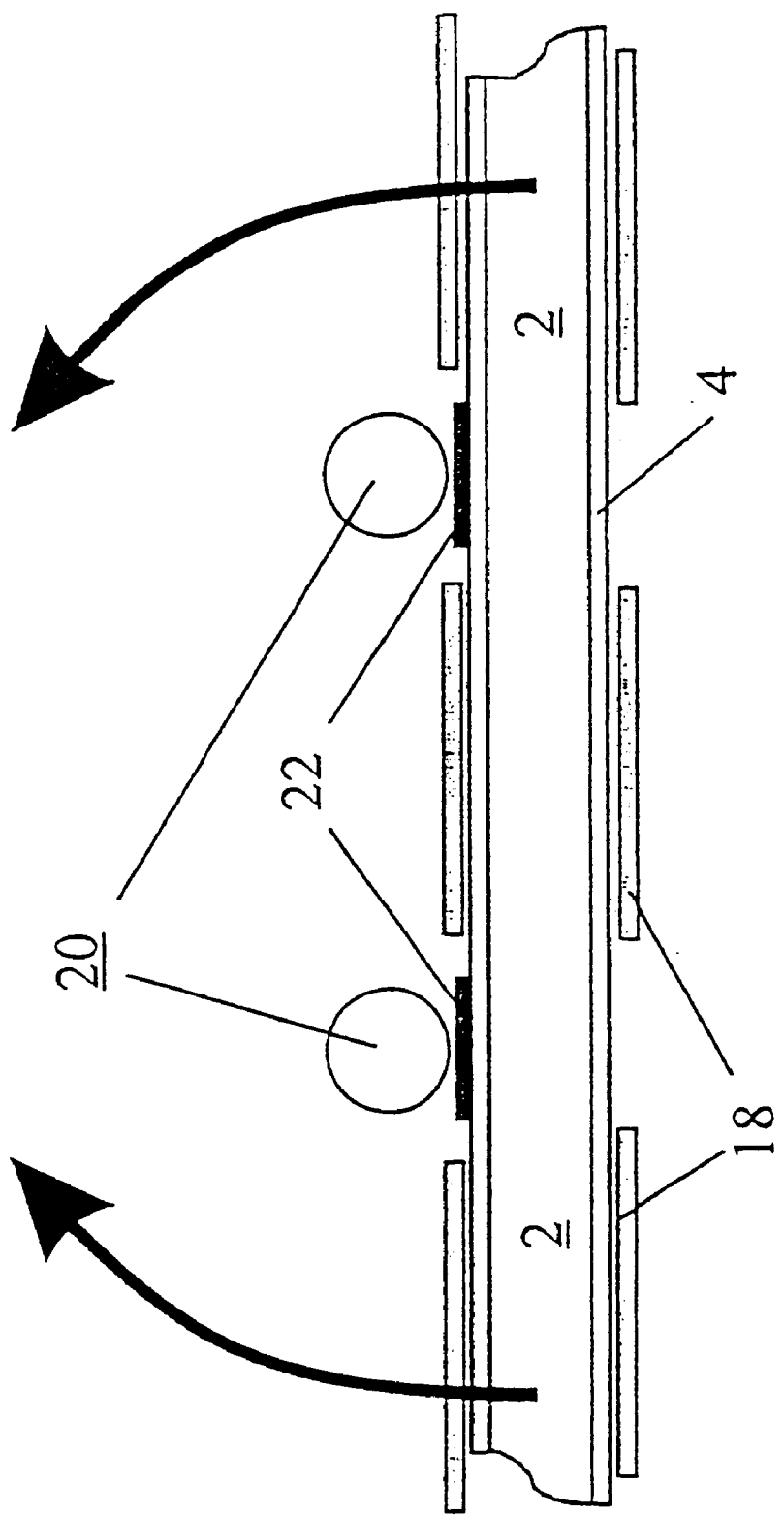
FIG. 4 shows a device for bending the insulated conductor bars.

FIG. 4 shows a bending device that has been modified from the state of the art. The insulated conductor bars are placed into the gripping jaws 18 of the bending device and are brought there into their final shape by moving the gripping jaws 18 in relation to the radial tools 20. Between the radial tools 20 and the insulating layer 4 of the conductor bar 2, is a protective layer 22 that distributes the pressure generated at the radial tools over the surface and in this way prevents an excessive pinching of the insulation layer. The uniformly distributed mechanical stress on the elastomer insulation layer prevents damage to the insulation layer. The bending of the involute causes very high tensile forces in the insulation layer that, in the case of standard materials, such as high-temperature thermoplasts, lead to breaks in the insulation layer. Polyethylene would have the necessary flexibility, but does not have the temperature stability required for the typical electrical machines, but could in principle be used in a similar manner for machines with low thermal utilization (T<90° C.). The same holds true for other flexible thermoplasts.

If the conductor bar is constructed of a bundle of individual conductors, the bending of conductor bars already provided with the main insulation causes both a relative movement of the individual conductors against each other as well as a relative movement of the individual conductors at the surface of the conductor bar against the main insulation. It is advantageous that the interface between conductor bar and main insulation has properties that enable a shifting of the individual conductors against the main insulation with reduced friction. This may be achieved, for example, by treating the conductor bar with separating agents. The occurrence of gaps due to this relative movement at the interface to the conductor is meaningless if an internal corona shielding connected tightly with the main insulation is used in this area. Without internal corona shielding, the shifting is, in most cases, uncritical because the field is reduced in the bend area (following the termination).

When using an internal corona shielding, it is advantageous that it has good adhesion to the main insulation, but has a lesser adhesion to the surface of the conductor bar. This is preferably achieved in that insulation and corona shielding are based on the same chemical materials (chemical bond), while the internal corona shielding and wire lacquering each have a different material base with, preferably, little affinity. Separating agents may be able to increase this effect. The conductor bars themselves are preferably not even Roebel-transposed in the area where the later bending takes place.

In another embodiment (not shown), injection molds are provided that can be used to apply main insulation to already bent sections of the conductor bar. For this purpose, the injection mold has three-dimensionally shaped sections that preferably can be adapted to certain tolerances of the conductor bar. Part of the advantages gained by using simple and cheap injection molds are lost with the injection molds designed for bent conductor bars. Nevertheless, this can be compensated for large volumes, especially if the molds adapted to already bent conductor bars can be used for several types as a result of standardization.

The complicated molds are also justified when internal corona shielding, insulation, and external corona shielding can be applied in one step. This can be accomplished, for example, with movable sections used to apply the layers by injecting, curing, moving the section, injecting, curing, etc. Alternatively, a multishot injection molding process can be used.

What is claimed is:

1. A method for applying a main insulation of a conductor bar, whereby the conductor bar has a rectangular cross-section and ends, and the method comprises the following steps:
   a) inserting the conductor bar with ends in an injection mold;
   b) centering the conductor bar in the injection mold so that a void for holding an insulation material remains between the conductor bar and the injection mold; and
   c) filling the void with an elastomer in order to form the main insulation.

2. The method as claimed in claim 1, wherein the void is filled with a silicone elastomer.

3. The method as claimed in claim 1, wherein the injection mold is open at the ends.

4. The method as claimed in claim 1, wherein the injection mold comprises a modular system including a plurality of individual components.

5. The method as claimed in claim 1, wherein an insulation thickness is identical on a wide side and a narrow side of the conductor bar.

6. The method as claimed in claim 1, further comprising: centering the conductor bar with at least one spacer element through which the conductor bar is positioned in a mold chamber of the injection mold, whereby the spacer element becomes part of the main insulation.

7. The method as claimed in claim 6, wherein the spacer element is manufactured from a material with a reactive chemical bond so that the spacer element is able to bond with the elastomer in order to form the main insulation.

8. The method as claimed in claim 6, wherein the spacer element is manufactured from a material that is the same as the main insulation.

9. The method as claimed in claim 1, further comprising:
centering the conductor bar with an adjustable mandrel through which the conductor bar is positioned in a mold chamber of the injection mold.

10. The method as claimed in claim 9, wherein the step of filling with an elastomer comprises injecting insulation material through an injection channel constructed in the mandrel, and further comprising retracting the mandrel after the insulation material has been injected, so that a void is created, and filling said void with the insulation material.

11. The method as claimed in claim 1, further comprising:
applying an internal corona shielding between an insulation layer and a conductor surface, wherein an adhesion between the internal corona shielding and the insulation layer is greater than an adhesion between the internal corona shielding and the conductor surface.

12. The method as claimed in claim 1, further comprising:
bending of an involute of the conductor bar.

13. The method as claimed in claim 1, wherein the conductor bar consists of a plurality of individual conductors.

14. The method as claimed in claim 13, wherein the individual conductors are temporarily connected to each other.

15. The method as claimed in claim 13, wherein the conductor bar is not Roebel-transposed in an area of an involute.

16. An insulated conductor bar, manufactured according to the method of claim 1.

17. A bending device for use in the method of claim 1, wherein a protective layer is arranged in an area of a radial tool.

18. The method as claimed in claim 1, wherein an insulation thickness is larger on a narrow side of the conductor bar than on a wide side.

19. The method as claimed in claim 13, wherein the conductor bar is treated with a separating agent.

20. The method as claimed in claim 13, wherein the individual conductors have a rectangular cross-section.

21. The method of claim 1, wherein the conductor bar is a stator winding.

* * * * *

UNITED STATES PATENT AND TRADEMARK OFFICE
CERTIFICATE OF CORRECTION

PATENT NO. : 6,645,416 B2
DATED : November 11, 2003
INVENTOR(S) : Albrecht Bock et al.

It is certified that error appears in the above-identified patent and that said Letters Patent is hereby corrected as shown below:

<u>Title page,</u>
Item [73], Assignee, should read:
-- [73]  Assignee:  Alstom (Switzerland) Ltd, Baden (CH) --

Signed and Sealed this

Twenty-third Day of March, 2004

JON W. DUDAS
*Acting Director of the United States Patent and Trademark Office*